United States Patent [19]

Fockens

[11] Patent Number: 5,036,308

[45] Date of Patent: Jul. 30, 1991

[54] IDENTIFICATION SYSTEM

[75] Inventor: Tallienco W. H. Fockens, Eibergen, Netherlands

[73] Assignee: N.V. Nederlandsche Apparatenfabriek Nedap, De Groenlo, Netherlands

[21] Appl. No.: 455,152

[22] Filed: Dec. 22, 1989

[30] Foreign Application Priority Data

Dec. 27, 1988 [NL] Netherlands ................. 8803170

[51] Int. Cl.$^5$ .................. G08B 13/14; H04B 1/44
[52] U.S. Cl. ................................. 340/572; 455/83
[58] Field of Search ............... 340/572, 551; 342/27; 367/93; 455/78, 83

[56] References Cited

U.S. PATENT DOCUMENTS

| 3,740,742 | 6/1973 | Thompson et al. | 340/572 |
|---|---|---|---|
| 3,810,172 | 5/1974 | Burpee et al. | 342/27 |
| 4,023,167 | 5/1977 | Wahlstrom | 342/42 |
| 4,476,459 | 10/1984 | Cooper et al. | 340/572 |
| 4,531,117 | 7/1985 | Nourse et al. | 340/572 |
| 4,667,185 | 5/1987 | Nourse et al. | 340/572 |
| 4,797,659 | 1/1989 | Larsen | 340/572 |
| 4,857,093 | 8/1989 | Carroll | 340/572 |

FOREIGN PATENT DOCUMENTS

| 0131440 | 1/1985 | European Pat. Off. | 340/572 |
|---|---|---|---|
| 0157095 | 10/1985 | European Pat. Off. | 340/572 |
| 0242906 | 10/1987 | European Pat. Off. | |
| 8203849 | 5/1983 | Netherlands | 340/572 |

Primary Examiner—Glen R. Swann, III
Assistant Examiner—Thomas J. Mullen, Jr.
Attorney, Agent, or Firm—Fleit, Jacobson, Cohn, Price, Holman & Stern

[57] ABSTRACT

An identification system for wireless electronic identification and data transmission, comprises a reading unit and at least one electronic label including a resonant circuit and carrying data stored in a memory device of the label, which data can be read wirelessly when the label is introduced into a high-frequency interrogation field formed by a transmitter of the reading unit. The reading unit includes a control device which, in operation, periodically switches the interrogation field on and off and in the time intervals when the field is switched off switches on a receiver capable of detecting a signal transmitted by a label. The at least one label includes a modulator which in the time intervals when the field is switched off can modulate the quality factor Q of the resonant circuit in dependence on the data stored in the memory device.

18 Claims, 3 Drawing Sheets

Tx ——31

——32

Cl ——33

1    0    0    1    0    1    1  ——34

——35

——36

——37

——38

——39

1    0    0    1    0    1    1   40

IDENTIFICATION SYSTEM

BACKGROUND OF THE INVENTION

This invention relates to an identification system for wireless electronic identification and data transmission, comprising at least one electronic label carrying data, which data can be read electromagnetically and wirelessly by an electronic reading unit. The electronic label, sometimes referred to as a responder, includes one or more active circuits, the feed energy for which is supplied by an interrogation field generated by the reading unit. Accordingly, the labels do not need an internal power source.

A system of this kind is disclosed in applicants' Netherlands patent 176404. The known system can operate according to the absorption principle. The absorption principle is based on the fact that a resonant LC circuit can absorb energy from an external field. The external field can be formed in two ways. First the external field may be a substantially magnetic A.C. field with the responder using a coil in an LC circuit to absorb energy from an external magnetic field. This may be, for example, a coil wound around a ferrite rod or an air coil. Second the external field may be a substantially electrical A.C. field with a capacitor plate in the responder having such a form as to effect a capacitive coupling with the electrical A.C. field of the reading unit, so that energy be absorbed from the external field The latter principle is disclosed in applicants' Netherlands patent application 8702426.

The absorption principle will now be described in more detail, assuming by way of example that the reading unit, sometimes referred to as an interrogator or transmitter/receiver, generates a substantially magnetic A.C. field. The magnetic A.C. field generated by the reading unit, referred to hereinafter as the primary field, generates a voltage across the LC circuit of a responder present in the field, which voltage is generated in the LC circuit of the responder owing to the change in flux of the primary field. Also, the voltage across the LC circuit is proportional to the resonant rise factor, sometimes referred to as the quality factor Q, of the LC circuit.

The electrical energy present in the LC circuit is alternately stored in the coil ($\frac{1}{2} LI^2$) and in the capacitor ($\frac{1}{2} CV^2$), and during the oscillation of the LC circuit the energy stored goes back and forth between the coil and the capacitor. This energy comes from the primary field and has been absorbed by the coil of the LC circuit of the responder from the primary field in a number of successive periods. The energy content of the primary field is thus decreased. This is expressed in an increase of the losses (or damping) of the antenna coil of the reading unit. The increase in damping in the primary circuit can be well detected electronically, as described in the above patent and in the patent application. Upon closer consideration, there is an energy balance. The absorption of energy from the primary field causes the energy content of the LC circuit of a responder to keep increasing. On the other hand, the energy content of the LC circuit decreases as a result of losses in the LC circuit and losses resulting from the load formed by (electronic) circuits of a responder connected to the LC circuit. In the condition of equilibrium, the energy output due to losses equals the energy input absorbed from the primary field by the LC circuit. In non-stationary situations, such as when the primary field is switched on or off, the LC circuit of a responder behaves as an energy buffer. When the primary field is switched on in one step, this will cause an oscillation in the LC circuit of a responder present in the field, with a gradually increasing amplitude. This results in the absorption of a net amount of energy until the situation of equilibrium is reached. Conversely, the LC circuit will continue to oscillate when the primary field is switched off in one step. The decrease in oscillation is then determined, and so is the increase after switching on, by the magnitude of the losses, i.e. by the quality factor Q. After Q periods, the amplitude of the oscillation has decreased to a factor $1/e$ of the initial value.

Accordingly, when the Q factor is sufficiently high, the LC circuit in the responder continues to oscillate for a considerable period of time after the primary field has been switched off, whereby the coil generates its own secondary magnetic field. By means of a receiver, either separate or connected to the antenna coil of the reading unit, the secondary field present after the transmission signal of the reading unit has been switched off can be detected.

One advantage of detection of the secondary field is that the transmission coil generating the primary field is then switched off. In the known identification systems, the primary field is always present, and the responder signal received must be filtered. However, the signal can only be filtered to a certain extent. There will always continue to be some noise because of the primary field being generated and being continuously present.

In European patent application 0157095, a shop lifting detection system is described, which is based on the detection of anti-theft labels during time intervals in which the primary field is temporarily switched off. However, these known anti-shop-lifting systems only permit the detection of the presence of a responder. It is not possible to transmit data to the reading unit and/or to identify individual responders.

It is an object of the present invention to provide a system combining the advantages of the shop-lifting detection systems described above with the advantages of the known identification systems. It is a more general object of the present invention to provide a detection system which operates effectively and reliably and, in addition to permitting the detection of the presence of a label, enables its identification and, if desired, data transmission between a label and the reading unit.

These and other objects are achieved, in accordance with the present invention, by providing an identification system for wireless electronic identification and data transmission, comprising a reading unit and at least one electronic label comprising a resonant circuit and carrying data stored in a memory device of the label and capable of being read wirelessly when the label is introduced into a high-frequency interrogation field formed by a transmitter of the reading unit, characterized in that the reading unit includes a control device which, in operation, periodically switches the interrogation field on and off and in the time intervals when the field is switched off switches on a receiver capable of detecting a signal transmitted by a label, said at least one label including a modulator which, in the time intervals when the field is switched off, can modulate the quality factor Q of the resonant circuit in dependence upon the data stored in the memory device.

BRIEF DESCRIPTION OF THE DRAWINGS

One embodiment of the invention will now be described, by way of example, with reference to the accompanying drawings, wherein.

DETAILED DESCRIPTION

Figure 1:
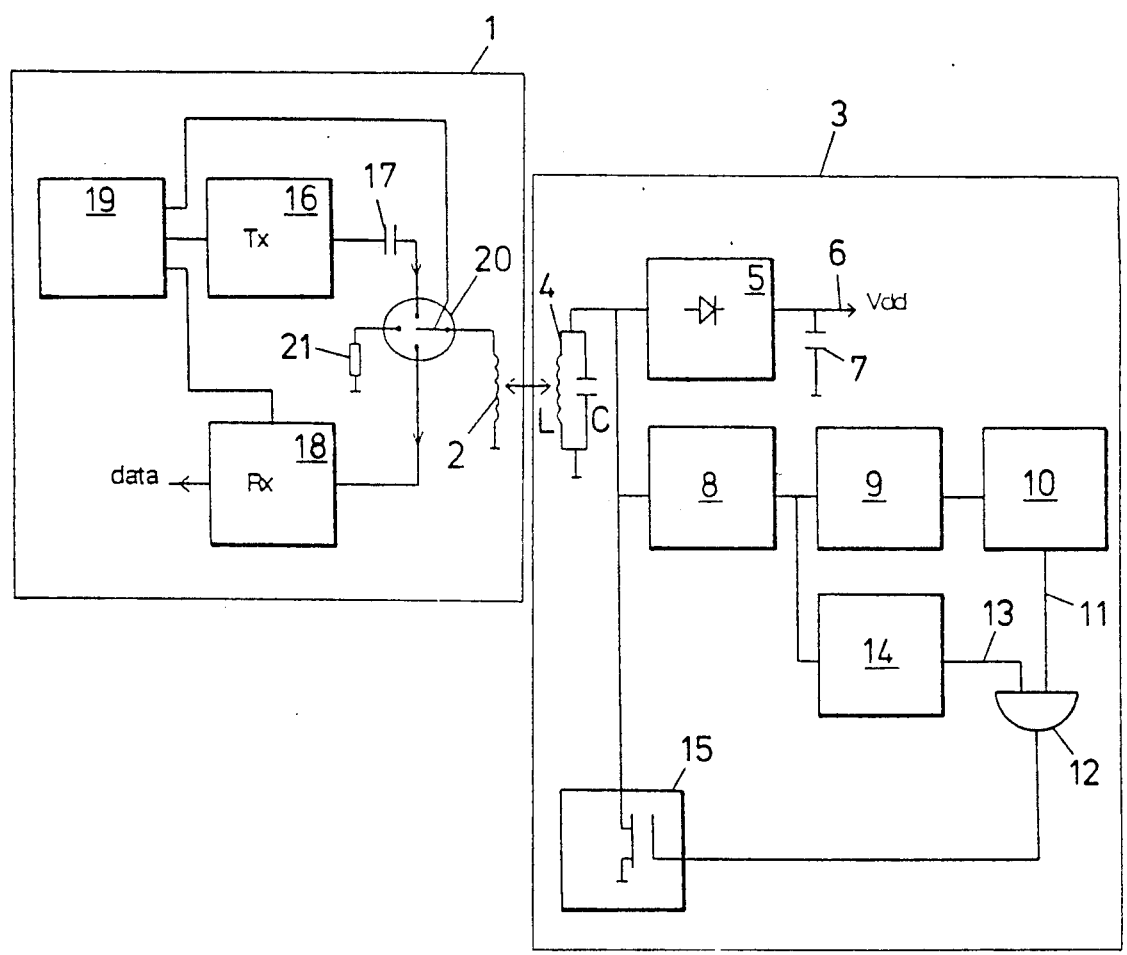
FIG. 1 shows schematically one embodiment of a system according to the present invention.

FIG. 1 shows a block diagram of one embodiment of an identification system according to the present invention. A reading unit or interrogation unit or transmitter/receiver 1 includes at least one antenna coil 2 which, in operation, generates an interrogation field—the primary field—in a pre-determined detection zone. Furthermore, there is shown a responder or label or detection plate 3 having a single resonant circuit 4. The resonant circuit includes at least coil L and at least capacitor C, and is tuned to the frequency of the interrogation field.

When a responder is within the interrogation field of the reading unit, an A.C. voltage is formed in known manner across the resonant circuit of the responder. The resonant circuit is connected to a rectifying circuit 5 which, in operation, provides a supply voltage Vdd to an output terminal 6 for the active elements of the rest of the responder circuit, to be described hereinafter. The output of the rectifying circuit is further connected to a capacitor 7 serving as a smoothing capacitor and buffer capacitor. Capacitor 7 can still provide supply energy after the primary field has been switched off. As will be described in more detail hereinafter, the primary field is periodically switched on and off, and the responder signals are detected in the time intervals when the primary field is switched off.

Circuit 4 is connected to a clock circuit 8 which derives clock pulses from the primary field's being switched on and off, which can be detected through the amplitude change of the voltage across the LC circuit.

The clock circuit provides clock pulses which are used to control the responder circuit. The responder circuit includes an address counter 9, which is controlled by the clock pulses and, in operation, can address the memory sites of a memory device 10. The memory sites or a part thereof, may for example be scanned in a predetermined sequence. In the memory, the code and/or data to be transmitted is stored. The output 11 of the memory device is connected to an input of an AND gate 12. The AND gate has a second input connected to the output 13 of a monostable multivibrator 14, sometimes referred to as a "one-shot" circuit. The input of the monostable multivibrator is connected to the output of the clock circuit. After receiving a clock pulse, the monostable multivibrator generates a pulse with a pre-determined duration. Whether, during the pulse of the monostable multivibrator, the AND gate is open, is determined by the signal prevailing at that moment at the output of the memory device. A signal passed by the AND gate is or is not supplied as a switching signal, via a buffer amplifier, to a switching means 15, which in this example takes the form of a short-circuiting transistor, connected to the LC circuit.

Accordingly, the contents of the memory device determine whether, after a clock pulse, the LC circuit, or any part thereof, is or is not short-circuited. It is noted that the switching means can also be used to connect the LC circuit to a load, such as a resistor, an additional coil, or an additional capacitor, or a combination thereof. Generally speaking, any manner of varying the quality factor Q of the LC circuit can in principle be used.

Reading unit 1 includes a transmitter 16 which in this example is connected through a capacitor 17 to at least one antenna coil which in operation generates the interrogation field. Furthermore, the reading unit comprises a receiver 18 capable of receiving processing signals received by the antenna coil 2. The transmitter and the receiver can alternately be connected to the antenna coil 2 by means of a switching device 20 controlled by a control device 19.

In order that, as the reading unit is switched from the transmission mode to the receiving mode, the transmission energy may be rapidly removed from the transmission circuit, the transmission antenna coil 2 may be connected to a suitable damping resistor as indicated, by way of example, at 21, before the connection with the receiver 18 is made.

It is noted that the transmitter and the receiver could alternatively each be provided with their own antenna coil.

Figure 2:
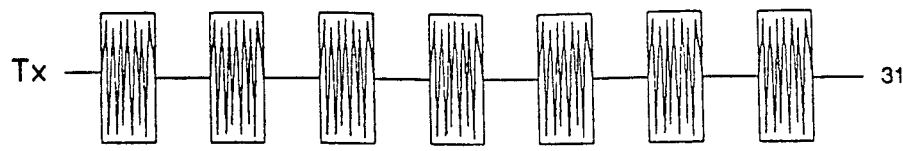
FIG. 2 shows a number of time diagrams of signals generated in a system as illustrated in FIG. 1.
Figure 2:
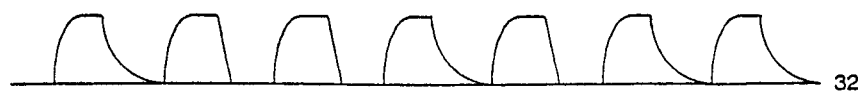
Figure 2:
Figure 2:
Figure 2:
Figure 2:
Figure 2:
Figure 2:
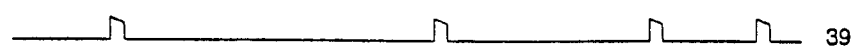

FIG. 2 shows schematically, in a number of graphs 31–40, various signals occurring in operation in a system according to the present invention.

Graph 31 shows the variation in the time of the amplitude of the primary field. The primary field is continually switched on and off with a preferred on/off ratio of 50/50. An important point is that after being switched off, the primary field should fade away quickly, while the build-up time, too, should be relatively short.

Graph 32 shows the variation in the time of the amplitude of the voltage across the LC circuit of a responder when it is within the above primary field. It can be clearly derived from the amplitude when the LC circuit keeps oscillating and when it does not. The amplitude is increased gradually after the primary field has been switched on. This increase stops after some time because the amplitude has reached the maximum that can be realized with the energy supplied, or, if a limiting circuit is used in the responder, because the maximum permissible supply voltage Vddmax has been reached, which results in an additional current in the limiting circuit. As soon as the primary field has been switched off, the amplitude of the voltage across the LC circuit decreases again according to an exponential curve.

Graph 33 shows the clock signal derived by the clock circuit 8 from the primary field's being switched on and off.

Graph 34 shows an example of a portion of a code stored in the memory 10. Combination of the pulses shown in graph 35 from the one-shot circuit 14 with the code through AND gate 12 provides the control voltage 36 for switch means 15.

Graph 37 shows the high-frequency voltage across the LC circuit, in which the fact whether the after-oscillation does or does not gradually decrease forms a bit of information.

Figure 3:
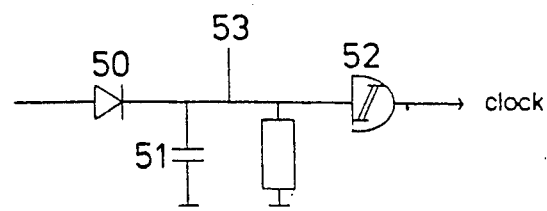
FIG. 3 shows schematically an embodiment of a part of the system of FIG. 1.
Figure 4:
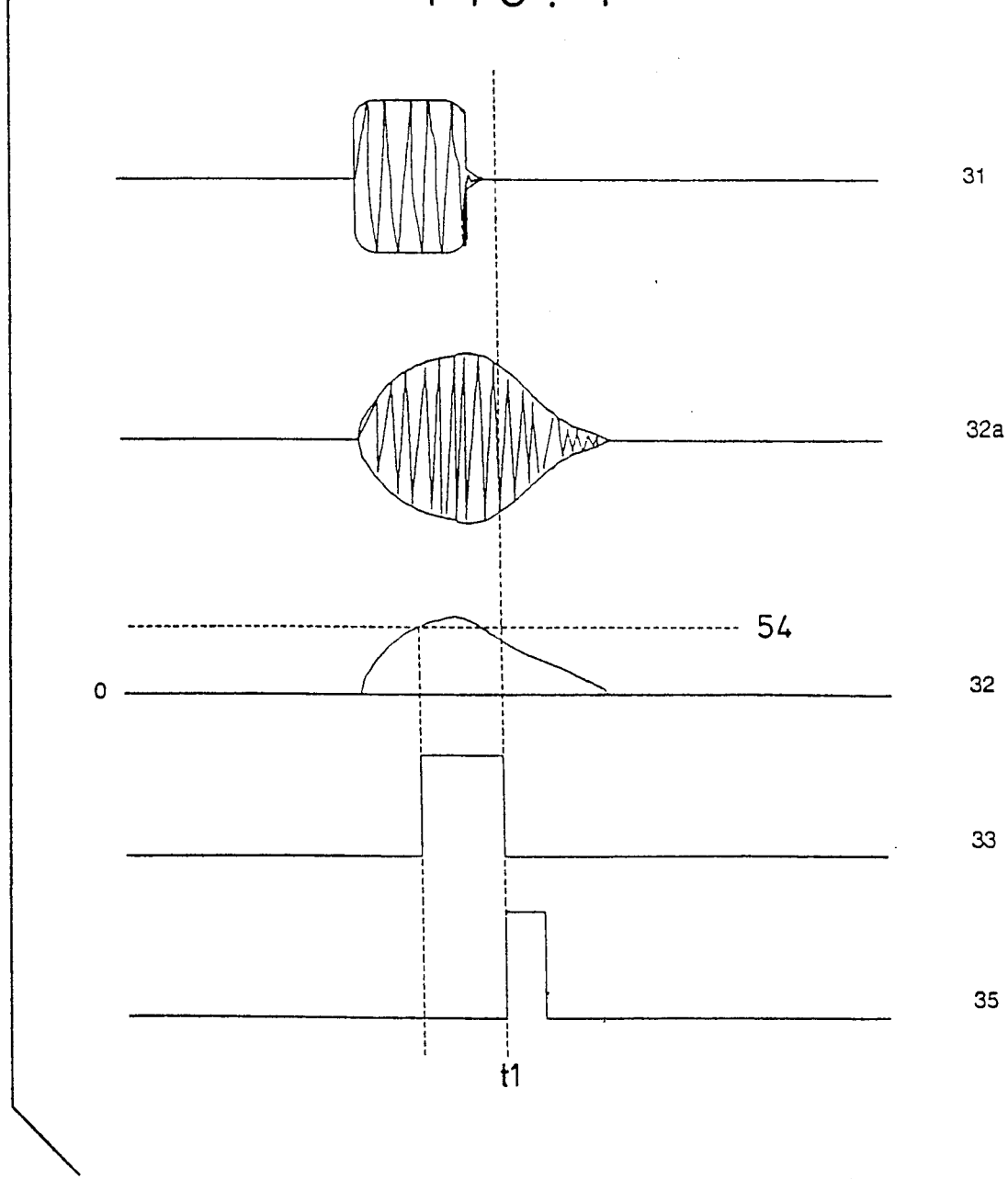
FIG. 4 shows schematically some signal forms which may occur in a system according to the invention.

FIG. 3 shows schematically an example of a clock circuit 8. The high frequency voltage 32 (shown in its unrectified form at 32a in FIG. 4) across the LC circuit is rectified (as shown at 32 in FIGS. 2 and 4) in a diode detector 50, and a capacitor 51 smooths the ripple. A level detector 52 provides a high output signal as soon as the amplitude (the voltage at point 53) exceeds a threshold value 54 (related to the instantaneous supply voltage Vdd) (see FIG. 4). The signal level at the output becomes low again as soon as the voltage at point 53 decreases below the threshold value 54. Level detector 52 has a certain built-in hysteresis to prevent recurrent switching of the output resulting from a residue of the high-frequency voltage ripple. Threshold value 54 is preferably relatively high and is, for example, about 80% of the supply voltage Vdd. The output voltage of the level detector is used in the further circuit of the responder as a clock signal 33. The highest frequency required for the clock signal is relatively low. The responder circuit can thus be built up with slow low-voltage integrated circuits, for example, CMOS circuits. The rising edges of the clock signal are used to increment the address counter 9, while the descending edge starts the one-shot circuit 14. The one-shot circuit generates a pulse beginning at the moment tl when the clock signal has become low, and hence shortly after the moment when the primary field is switched off, and which has a pulse length determined by an RC circuit in the one-shot circuit. Also see signal 35 in FIG. 4.

This pulse, which indicates the period of time when switch means 15 should possibly be closed, is supplied to the AND gate 12. Also supplied to the AND gate are the code bits from memory 10, so that the pulse from the one-shot circuit 14 is supplied to switch 15 when the output signal from the memory is high.

The polarity of the data can be freely selected. By way of example, it has been assumed that one data bit = logical 1 corresponds to the low voltage at the output of the memory. The result is that at a data bit = 1 the switch means is not closed by the pulse from the one-shot circuit, and that hence the LC circuit continues to oscillate after the primary field has been switched off. Conversely, a data bit = 0 causes the switch means 15 to be closed, so that the LC circuit is short-circuited, and oscillation stops immediately. In graph 32, this is clearly shown at the second, third and fifth signal forms. In a receiver circuit, this after-oscillation can be detected by, for example, temporarily coupling a receiver with the antenna coil of the reading unit. The time intervals when the receiver is activated can be determined, for example, by the sampling pulses indicated in graph 38 in FIG. 2. The received signal 39 can be passed, possibly after being amplified, to a detection circuit not shown, which reconstructs the code transmitted by the responder, see graph 40 in FIG. 2.

It is noted that after reading the above, various modifications will readily occur to those skilled in the art. Thus, for example, the responder may be provided, with or cooperate with, one or more sensors capable of modifying the content of at least a part of the memory device. The signal 40 can then represent both a code and the information observed by the sensors. Furthermore, a different type of switching means can be used. These and similar modifications are considered to be within the scope of the present invention.

I claim:

1. In an identification system for wireless electronic identification and data transmission, comprising a reading unit and at least one electronic label, each electronic label comprising a resonant circuit and carrying data stored in a memory device of label and capable of being read wirelessly when the label is introduced into a high-frequency interrogation field formed by a transmitter of the reading unit, the improvement wherein:

said reading unit comprises a control device which, in operation, periodically switches the interrogation field on and off and in the time intervals when the field is switched off switches on a receiver capable of detecting a signal transmitted by a label; and said at least one label each comprises a modulator in which in the time intervals when the field is switched off modulates the quality factor Q of the resonant circuit in dependence on the data stored in the memory device.

2. An identification system as claimed in claim 1, wherein the modulator includes a switch means controlled by output signals from the memory device in the time intervals when the interrogation field is switched off.

3. An identification system as claimed in claim 2, wherein the switch means when energized at least partly short-circuits the resonant circuit.

4. An identification system as claimed in claim 1, wherein said at least one label each comprises a clock circuit receiving from said resonant circuit a high frequency voltage generated in use in said resonant circuit by said high frequency interrogation field, and having an amplitude level and wherein said clock circuit detects said amplitude level and generates clock signals from variations in said amplitude level.

5. An identification system as claimed in claim 4, wherein the clock circuit includes a rectifier and a smoothing capacitor, and further a level detector providing a high output signal when the voltage across the smoothing capacitor exceeds a pre-determined level, and providing a low output signal when the voltage across the smoothing capacitor decreases below a pre-determined level; and that the output signal of the level detector forms the clock signal.

6. An identification system as claimed in claim 4, wherein the output of the clock circuit is connected to a monostable multivibrator and to an address counter which, in turn, is connected to the memory device, the output of the memory device and the monostable multivibrator each being connected to an input of an AND gate circuit whose output is connected to the switch means.

7. An identification system as claimed in claim 1, wherein said at least one label each comprises a means connected to the resonant circuit and a smoothing capacitor for forming supply voltage for active circuits of the label.

8. An identification system as claimed in claim 1, wherein the reading unit comprises at least coil and a switch controlled by said control device to connect said at least one antenna coil alternately with the output of the transmitter and the input of the receiver.

9. An identification system as claimed in claim 8, wherein when switching off the interrogation field, the switch connects the antenna to a suitable damping resistor before connecting the antenna coil to the receiver.

10. An identification system as claimed in claim 1 wherein said at least one label each comprises at least one sensor capable of affecting the contents of the memory device.

11. A label for use in an identification system for wireless electronic identification and data transmission, said system comprising at least one electronic label, and a reading unit including a transmitter for generating a high-frequency interrogation field, wherein the reading unit comprises a control device which, in operation, periodically switches the interrogation field on and off and in the time intervals when the field is switched off switches on a receiver capable of detecting a signal transmitted by a label, and said at least one label each comprises a resonant circuit, a memory device sorting data, and a modulator which in the time intervals when the interrogation field is switched off modulates the quality factor Q of the resonant circuit in dependence on the data stored in the memory device.

12. A label as claimed in claim 11, wherein the modulator includes a switch means controlled by output signals from the memory device in the time intervals when the interrogation field is switched off.

13. A label as claimed in claim 12, wherein the switch means when energized at least partly short-circuits the resonant circuit.

14. A label as claimed in claim 11 and further comprising a clock circuit forming clock signals generated by said switching of said interrogation field.

15. A label as claimed in claim 14, wherein the clock circuit comprises a rectifier and a smoothing capacitor, and further a level detector providing a high output signal when the voltage across the smoothing capacitor exceeds a pre-determined level, and providing a lower output signal when the voltage across the smoothing capacitor decreases below a pre-determined level, and the output signal of the level detector forms the clock signal.

16. A label as claimed in claim 14, wherein the output of the clock circuit is connected to a monostable multivibrator and to an address counter which, in turn, is connected to the memory device, the output of the memory device and the monostable multivibrator each being connected to an input of an AND gate circuit whose output is connected to the switch means.

17. A label as claimed in claim 11 and further comprising rectifier means connected to the resonant circuit and a smoothing capacitor for forming supply voltage for active circuits of the label.

18. A label as claimed in claim 11 and further comprising at least one sensor capable of affecting the contents of the memory device.

* * * * *